(12) United States Patent
Krejdl

(10) Patent No.: US 10,607,010 B2
(45) Date of Patent: Mar. 31, 2020

(54) SYSTEM AND METHOD USING FUNCTION LENGTH STATISTICS TO DETERMINE FILE SIMILARITY

(71) Applicant: Avast Software s.r.o., Prague (CZ)

(72) Inventor: Michal Krejdl, Prague (CZ)

(73) Assignee: AVAST SOFTWARE S.R.O., Prague (CZ)

(*) Notice: Subject to any disclaimer, the term of this patent is extended or adjusted under 35 U.S.C. 154(b) by 207 days.

(21) Appl. No.: 15/720,321

(22) Filed: Sep. 29, 2017

(65) Prior Publication Data

US 2018/0096145 A1 Apr. 5, 2018

Related U.S. Application Data

(60) Provisional application No. 62/402,658, filed on Sep. 30, 2016.

(51) Int. Cl.
*G06F 21/00* (2013.01)
*G06F 21/56* (2013.01)
*H04L 29/06* (2006.01)

(52) U.S. Cl.
CPC ...... *G06F 21/563* (2013.01); *G06F 2221/033* (2013.01); *G06F 2221/034* (2013.01); *G06F 2221/2115* (2013.01); *H04L 63/145* (2013.01)

(58) Field of Classification Search
CPC ............ G06F 21/563; G06F 2221/033; G06F 2221/034
USPC .......................................................... 726/23
See application file for complete search history.

(56) References Cited

U.S. PATENT DOCUMENTS

| | | | |
|---|---|---|---|
| 2008/0250018 A1 | 10/2008 | Geffner et al. | |
| 2010/0180344 A1 | 7/2010 | Malyshev et al. | |
| 2011/0099635 A1 | 4/2011 | Silberman et al. | |
| 2013/0198841 A1* | 8/2013 | Poulson | G06F 21/51 726/23 |
| 2016/0335437 A1* | 11/2016 | Yang | G06F 21/56 |

FOREIGN PATENT DOCUMENTS

WO    2012091400 A1    7/2012

* cited by examiner

*Primary Examiner* — Anthony D Brown
(74) *Attorney, Agent, or Firm* — Husch Blackwell LLP

(57) ABSTRACT

A file similarity vector for an executable file or executable object can be determined using function lengths of functions in the executable file or data object. The executable file or data object can be scanned, and lengths of functions can be determined. Various statistics such as number of functions, maximum function length, minimum function length, and average function length can be used to create a file similarity vector. The file similarity vector can be used to compare files.

19 Claims, 5 Drawing Sheets

SYSTEM AND METHOD USING FUNCTION LENGTH STATISTICS TO DETERMINE FILE SIMILARITY

CROSS-REFERENCE TO RELATED APPLICATIONS

This Application claims priority to U.S. Provisional Patent Application Ser. No. 62/402,658, filed on Sep. 30, 2016, entitled "Function Length Statistics to Determine File Similarity," the entire disclosure of which is incorporated herein by reference.

FIELD OF INVENTION

The present invention relates generally to anti-malware technology, and more particularly, to the detection of malware by utilizing function length statistics to determine file similarity.

BACKGROUND OF INVENTION

Malware, short for "Malicious Software," is software that can be used to disrupt computer operation, damage data, gather sensitive information, or gain access to private computer system without the user's knowledge or consent. Examples of such malware include software viruses, Trojan horses, rootkits, ransomware, etc. A common mechanism used by malware developers is to embed the malware into a file that is made to appear desirable to user, or is downloaded and executed when the user visit a website. For example, malware may be embedded into a software application that appears legitimate and useful. The user downloads the file, and when the file is opened, the malware within the file is executed. A file that contains malware can be referred to as malicious file.

In the face of the growing threat of malware, many anti-malware software packages were developed to detect malware in a user's files. Upon detection, the anti-malware software may notify the user of the presence of the malware, and may automatically remove or quarantine the malware. However, conventional system for detecting the malware requires significant time consumption to analyze an object file or data. While using a disassembly database, the program analysis load can be reduced because the file function can be compared with another file function, but it can be ineffective in detecting obfuscated malware. For these reasons, a need for an improved method for detecting malware, particularly without reducing system performance, exists.

SUMMARY OF INVENTION

The present invention relates generally to a system and method for detecting malicious software using a file similarity vector. In order to detect malicious software, an executable file or executable object can be determined using function lengths of functions in the executable file or data object.

One embodiment of the present invention is directed to method wherein the program is being executed on a computer system, which can include a single computing device or multiple computing devices connected through a network. The method can include step of receiving an executable file for running an operating system (OS), where the executable file formats are variable, not limited, to the OS of the computing device. For example, the executable file may be a PE file used in a Microsoft Windows system, an ELF file used in a Linux system, an ELF file used in a UNIX system, or a Mach-O file used in a MAC OS X. The executable file can include a header, code, and data sections. The system may scan or search the executable file and a value in the code section can be a reference. In case of PE file system, if a scanned value is an opcode, then the system resolves a target address. However, if the scanned value is not an opcode, then the system may use a virtual address from a memory unit of the system. Various statistics, such as number of functions, maximum function length, minimum function length, and average function length, can be used to create a file similarity vector. The file similarity vector for a file may be compared with file similarity vectors of the other files known to contain malware. The system can determine if the target address is for a valid function. For example, if the system is set with a predetermination threshold value as "six:6," the system may continue a disassembling instruction by the sixth instruction until the end of function is reached. Accordingly, a length of the detected functions or various statistic data of the file can be determined.

Another embodiment of the present invention relates to a non-transitory storage medium having a program stored thereon that is configured for analyzing whether an executable program on a computing device contains malware. The program on the computer readable storage medium is adapted for searching a code section of the executable file for acquiring functional references. Subsequently, the computing program may determine one or more statistics associated with the set of one or more functions, and the length of the function. The statistics can be incorporated into the file similarity vector. For example, a statistic average function length value can be determined if the file similarity vector can include the average function values. Based on the file comparison, the file similarity vector can be provided for an efficient malware detection.

Other objects and features will be in part apparent and in part pointed out hereinafter.

BRIEF DESCRIPTION OF THE DRAWINGS

For a better understanding of the disclosure, reference may be made to the accompanying drawings in which.

DETAILED DESCRIPTION

Figure 1:
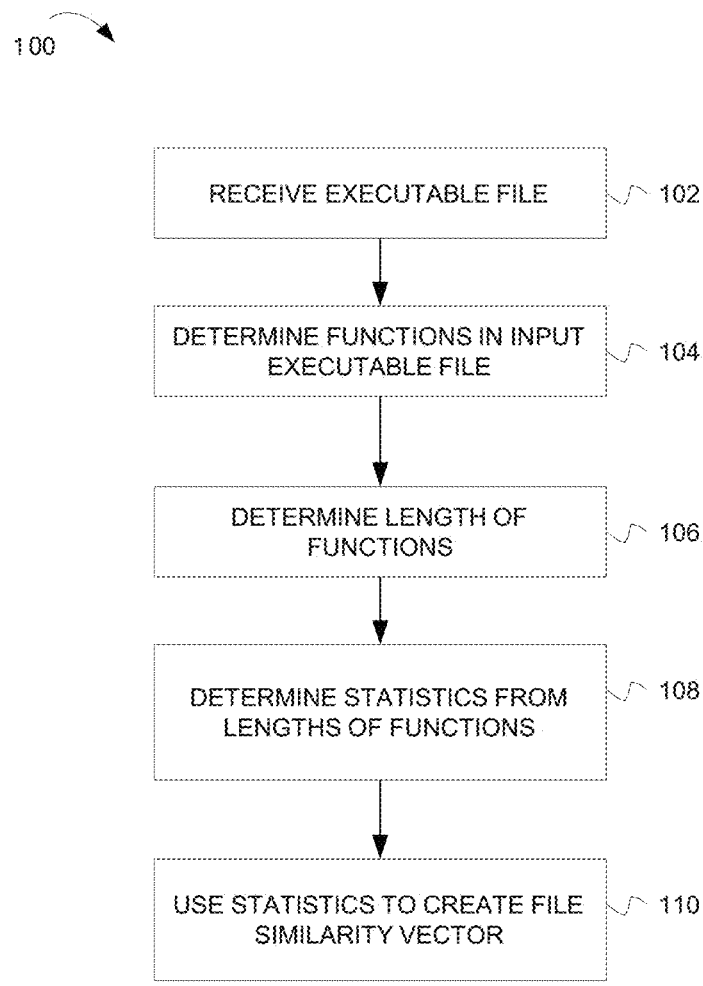
FIG. 1 is a flow chart illustrating a method for determining a file similarity vector in accordance with one embodiment of the present invention.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

In various aspects of the disclosure, a file similarity vector is generated for an executable file or object. In some aspects, the file similarity vector includes values related to aspects of functions in an executable file or object. For example, a file similarity vector generator can determine the lengths of various functions in an executable file or object, and a file similarity vector can be formed that includes values comprising statistics regarding the function lengths.

FIG. 1 is a flow chart 100 illustrating a method for creating or determining a file similarity vector in accordance with present invention. At block 102, the method receives an executable file as input. The executable file can be any type of file that contains executable instructions. For example, the executable file can be an application, an object code library, or an object code file.

At block 104, the executable file is scanned and the location of functions in the executable file are determined.

At block 106, the length of each of the functions in the executable file is determined. In some aspects, the length can be determined as a number of instructions in the function. In alternative aspects, the length can be determined as a number of bytes occupied in memory by the instructions. In some embodiments, the length of a function can be determined by disassembling the code for the function until a return instruction is encountered as will be further described below. In alternative embodiments, the portable executable (PE) file may contain information about function start and end points as part of an exception handling mechanism. In such cases, this information can be used to determine function lengths.

At block 108, various statistics can be determined from the set of function lengths in the executable file. In some aspects, the statistics can include any combination of one or more of:

The number of functions in the executable file.
The maximum length of a function in the executable file.
The minimum length of a function in the executable file.
The average length of the functions in the file
An entropy value of the set of lengths (e.g., a Shannon entropy value).

Those of skill in the art having the benefit of the disclosure will appreciate that other statistical values can be included for the set of functions.

At block 110, the statistical values determined at block 108 are used to create a file similarity vector for the executable file. The values in the vector can be an ordered combination of the statistical values determined at block 108.

Figure 2:
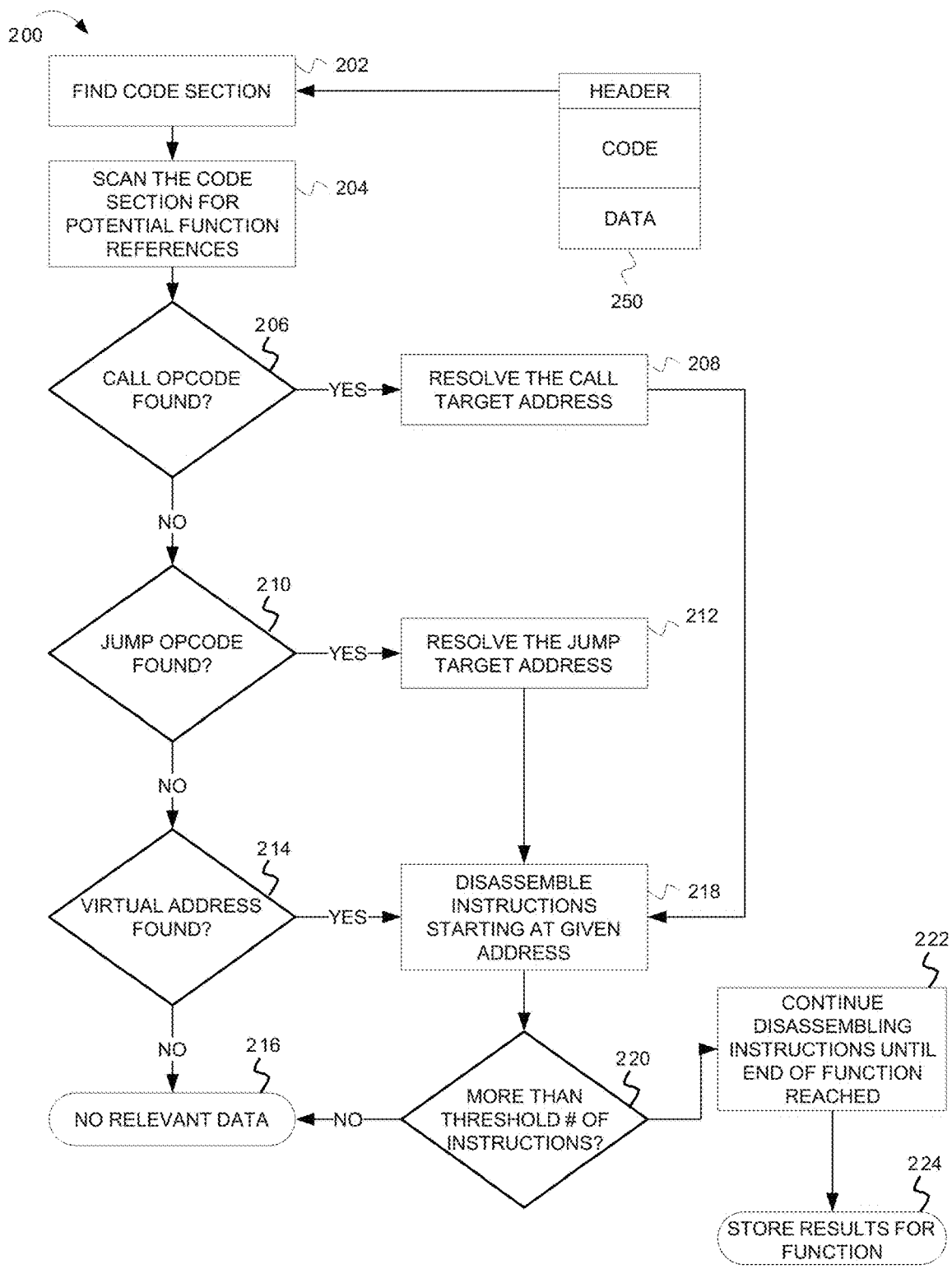
FIG. 2 is a flow chart illustrating a method for determining a file similarity fingerprint in accordance with one embodiment of the present invention.

FIG. 2 is a flow chart 200 illustrating further details of operations of a method for determining a file similarity vector for an executable file 250 according to embodiments. In some aspects, the executable file 250 can be a PE file that is commonly used on various versions of the Microsoft Windows family of operating systems. However, the inventive subject matter is not limited to PE files, and in alternative aspects, the executable file 250 can be an Executable and Linkable Format (ELF) file commonly used in Linux or UNIX based system or a Mach-O file commonly used in MAC OS X operating systems. In some aspects, executable file 250 has a header section, at least one code section (sometimes referred to as a text section) and at least one data section.

At block 202, the code section of the executable file 250 is located. In some aspects, the start of the code section can be located using information in the header section.

At block 204, the code section is scanned for potential function references. The code section typically comprises delimited function blocks (i.e., sequences of instructions). Blocks 206-210 are decision blocks that attempt to determine if a value in the code section is a function reference.

At block 206, a check is made to determine if a currently scanned value in the code section is an opcode for a call instruction. For example, for a PE file, a check can be made to determine if the byte value is E8h.

If the currently scanned value is an opcode for a call instruction, then at block 208, the target address for the call instruction (i.e., the address of the start of the called function) is resolved. The method then proceeds to block 218.

If the currently scanned value is not an opcode for a call instruction, then at block 210, a check is made to determine if the currently scanned value in the code section is an opcode for a jump. For example, for a PE file, a check can be made to determine if the byte value is E9h. In some cases, malware authors attempt to obfuscate the malware code by using a jump instruction instead of a call instruction. If the jump instruction is to a block of code that has been previously resolved as a function, then the jump can be ignored. Otherwise, the target address of the jump can be treated as the beginning of a function and processed as described below.

If the currently scanned value is an opcode for a jump instruction, then at block 212, the target address of the jump instructions is resolved. The method then proceeds to block 218.

If the currently scanned valued is not an opcode for a jump instruction, then at block 214, a check is made to determine if the currently scanned value is a virtual address. For example, for a PE file, the currently scanned value may be part of an array of virtual addresses. If the currently scanned value is a virtual address, a check can be made to determine if the value is an address in the memory bounds of the code section. If so, a further check is made to determine if the address resolves to an already known function. If so, the address can be ignored.

If the currently scanned value is not a virtual address, then the method ends at block 216 with no relevant data to process (i.e., there were no functions detected in the scanned code section).

Block 218 is executed if a potential function is detected at blocks 208, 210 or 214. At block 218, disassembly of a predetermined or configurable number of instructions starting at the target address is attempted in order to determine if the target address is for a valid function. In some aspects, disassembly of six instructions is attempted.

At block 220, a check is made to determine if the predetermined or configurable number of instructions could be disassembled. If a predetermined or configurable number of instructions starting at the target address could not be successfully disassembled, then the method proceeds to block 216 with no relevant data to process.

If the disassembly was successful, then the method proceeds to block 222 to continue disassembling instructions until an indication that the end of the function has been reached (i.e., a return instruction is encountered). In some aspects, a system executing the method may encounter a return instruction prior to the actual end of the function. For example, a return instruction may be part of a conditionally executed branch of code. Thus, in some aspects, the system will check for this case and continue disassembling the code until the return instruction that actually ends the function is reached. The number of instructions that are successfully disassembled before reaching the end of the function are counted.

At block 222, the counted results (i.e., the length of the detected function) may be normalized and are stored for later analysis. In some aspects, normalization can include processing overlapping function blocks to remove duplication so that a set of unique function blocks is obtained.

As discussed above, after the lengths of the detected functions in the executable file 250 have been determined, various statistics can be determined from the function lengths. The statistics can be incorporated into a vector of numbers that are referred to as the file similarity vector. As noted above, these statistics can include the number of functions in the executable file, the maximum function length, the minimum function length, the average function length of the functions in the executable file 250, and an entropy value of the set of function lengths. In some aspects, the file similarity vector can include other values. For example, the file similarity vector may include one or more of a ratio of arithmetic, logic, codeflow etc. instructions inside the functions, counts of operand types in the functions, etc.

The file similarity vector for a file can be used to compare the file with other files having file similarity vectors. For example, a Euclidian distance between two file similarity vectors can be calculated. The Euclidian distance can be used to determine if the two files are similar or not. The Euclidian distance can be used alone, or as an extension to other methods to determine file similarity.

In some aspects, the file similarity vector can increase the efficiency of file comparisons on a computing system. The file similarity vector can provide an efficient mechanisms to compare two files that can be more efficient than doing a byte by byte comparison of the files. Further, in some embodiments, execution and storage efficiency can be improved over previous techniques that build a function library for permanent usage. For example, systems and methods of the disclosure store the overall statistics. Once this has occurred, all the particular functions scanned are irrelevant and can be dropped. Further, more information may be obtained in some embodiments, because previous techniques focus on one or relatively few function which may be common for the compared files. In contrast, the above described file similarity vector incorporates information from all detected functions in an executable file into the statistics.

Figure 3A:
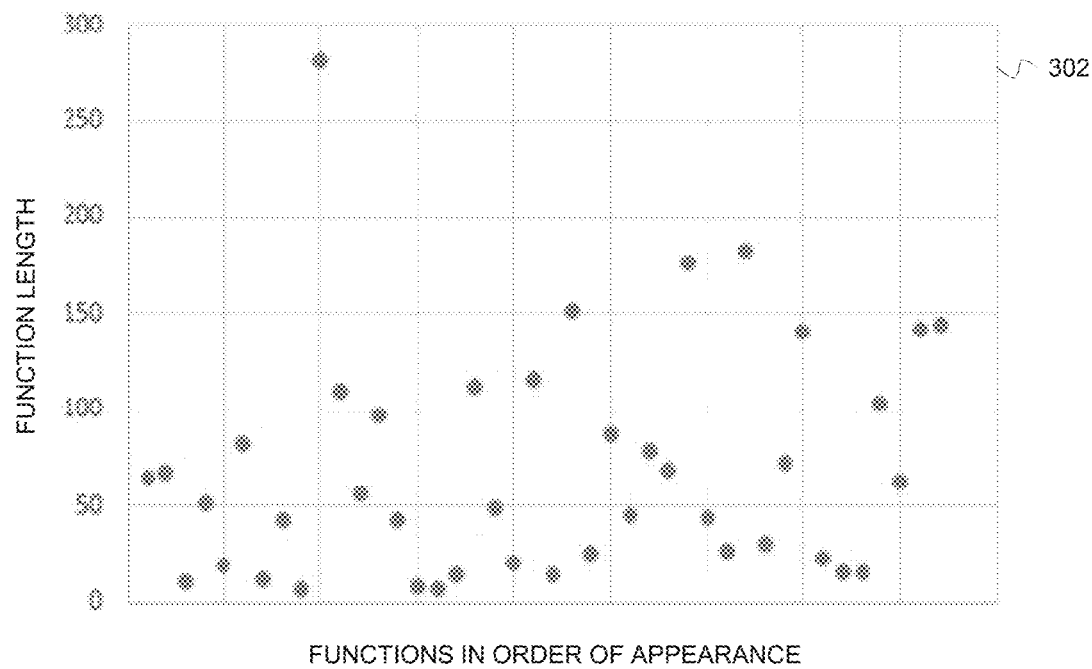
FIG. 3A is a graph illustrating an example count of function length for functions in their order of their appearance in an executable file.
Figure 3B:
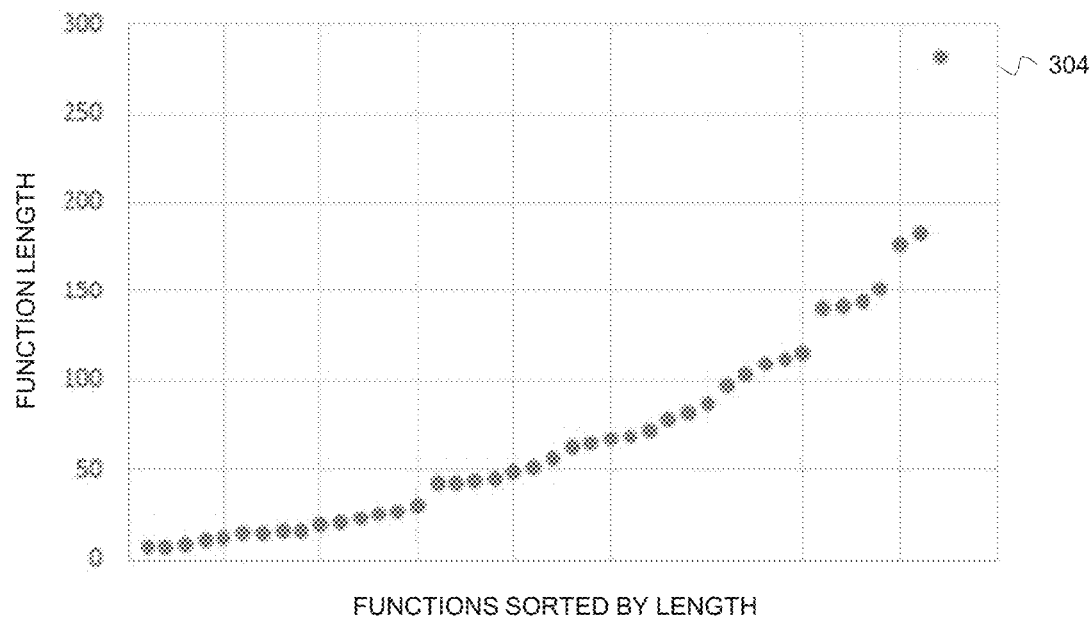
FIG. 3B is a graph illustrating an example count of function length for the same functions in the executable of FIG. 3A, wherein the functions are sorted by function length.

FIGS. 3A and 3B provides graphs illustrating example results of the methods illustrated in FIGS. 1 and 2 applied to an example executable file. Graph 302 illustrates an example count of function length for functions in the order of their appearance in an executable file. Graph 304 illustrates an example count of function length for the same functions in the executable as in graph 302, however in this case, the functions are sorted by function length. In the example illustrated in FIGS. 3A and 3B, the analysis performed according to the methods of FIG. 1 and FIG. 2 provides the following results, which can be used to form a file similarity vector:

Number of functions: 42
Min function length: 7
Max function length: 282
Average function length: 73
Entropy: 3.63

Figure 4:
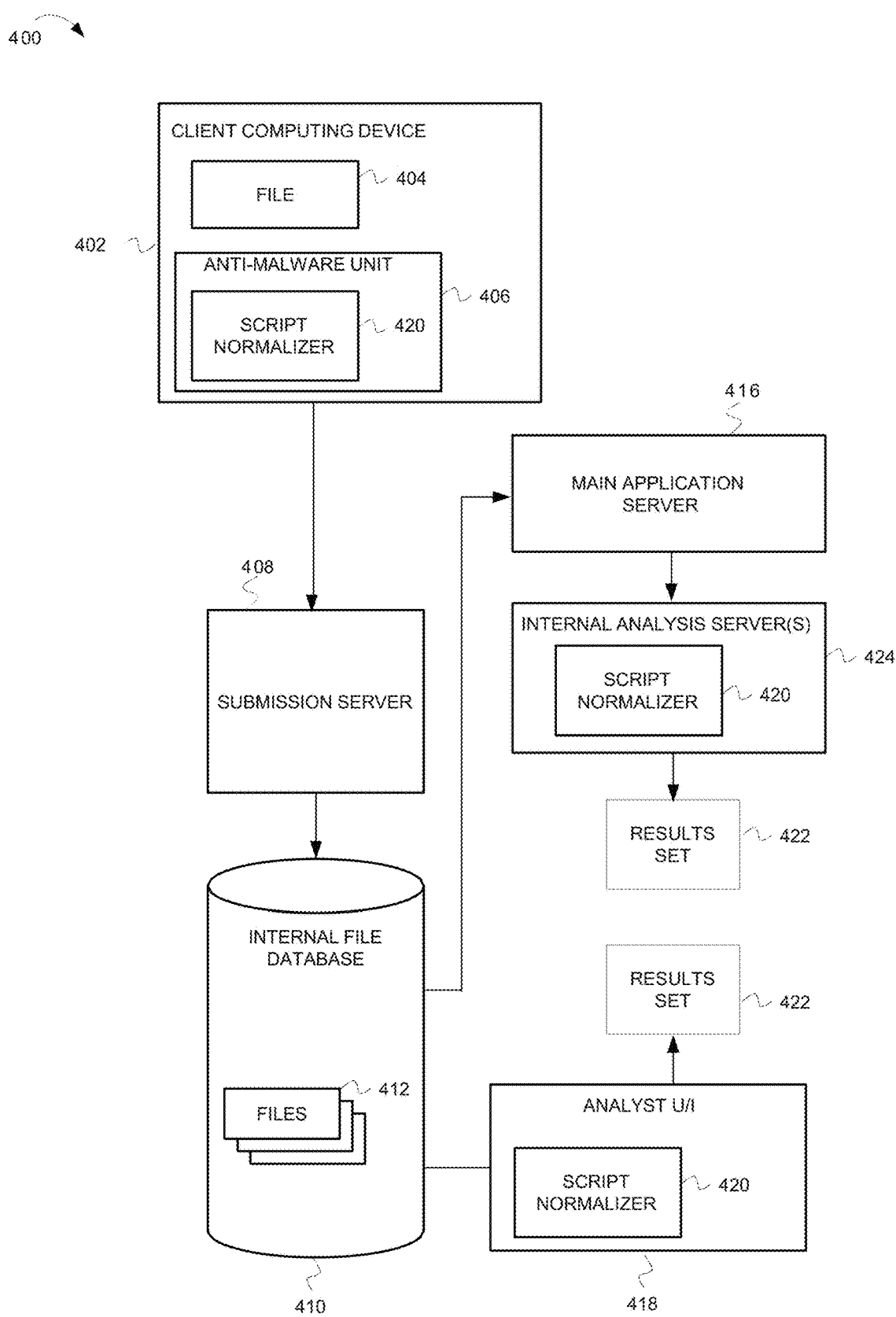
FIG. 4 is a block diagram illustrating an example system utilizing file similarity vectors in accordance with one embodiment of the present invention.

FIG. 4 is a block diagram illustrating an example system 400 utilizing file similarity fingerprints according to embodiments. In some embodiments, system 400 includes client computing device 402, submission server 408, internal file database 410, main application server 416, internal analysis server 424, and an analyst user interface (U/I) 418.

Client computing device 402 can be a desktop computer, laptop computer, tablet computer, smart phone, personal digital assistant, media player, set top box, or any other device having one or more processors and memory for executing computer programs. The embodiments are not limited to any particular type of computing device. Client computing device 402 can include an anti-malware unit 406. Anti-malware unit 406 can include one or more of software, firmware or other programmable logic that can detect malicious files. Additionally, anti-malware unit 406 can submit a new file 404 for analysis. The new file may be a file that has not been seen before by the anti-malware unit 406, or may have only been seen on a low number of systems (e.g., the file may be a day one malware source). Anti-malware unit 406 can include a script normalizer or file similarity vector generator 420 that generates a file similarity vector as described above in FIGS. 1 and 2. The anti-malware unit 406 can generate a file similarity vector for file 404. The resulting file similarity vector can be compared to file similarity vectors associated with known malware to determine if the file 404 contains malware, or is suspected of containing malware. In response to determining that the file contains malware, the anti-malware unit 406 can alert the user, quarantine the file 404, and/or remove the malware from the file 404.

In response to determining that the file 404 is suspected of containing malware, client computing device 402 can submit file 404 to submission server 408. Submission server 408 can perform preprocessing on the new file 404 and add the new file to a collection of files 412.

Main application server 416 may select a particular classification server (not shown) based on load balancing and availability considerations. Main application server 416 may also distribute files to one or more internal analysis servers 424 for analysis. Analyst U/I 418 can provide a user interface for an analyst to access tools that can be used to determine if a file contains malware. The analyst U/I 418 may include a script normalizer or file similarity vector generator 420 that can be used to generate a file similarity vector as described above that can be associated with a file under analysis. The generated similarity fingerprint can be compared to fingerprints associated with known malware, or known clean files to aid in determining if a file contains malware. Further, in some aspects, the analyst U/I 418 can receive an unknown file (e.g., a PE file that has not been analyzed yet). The analyst U/I 418 can determine the file similarity vector for the unknown file as described above. Then, the analyst U/I 418 can compute the distance of this vector from the vectors associated with files 412 in the internal file database 410 and return file identifiers for the nearest neighbors. For example, the 10 most similar files in the internal file database 410 may be returned.

Internal analysis servers 424 can perform static or dynamic analysis of a file for internal database 410. In some aspects, an internal analysis application can perform a static analysis of a file. Internal analysis server 424 can include a script normalizer or file similarity vector generator 420 that can be used to generate a file similarity vector as described above that can be associated with a file under analysis. The generated file similarity vector can be compared to file similarity vectors associated with known malware, or known clean files to aid in determining if a file contains malware. Further, the file similarity vector generated for the file can be stored along with the file in internal file database 410.

The analyst U/I 418 and/or the internal analysis server 424 can produce a results set 422. For example, a results set 422 can comprise the N most similar files for a given query and N. The queries can be provided by an analyst via analyst U/I 418 or can be issued by an internal processing automaton.

While the above discussion has been presented in the context of malware detection, those of skill in the art having the benefit of the disclosure will appreciate that the file similarity vector can be useful in other executable file comparison or clustering environments. Use of the file similarity vector in these environments are within the scope of the inventive subject matter.

Figure 5:
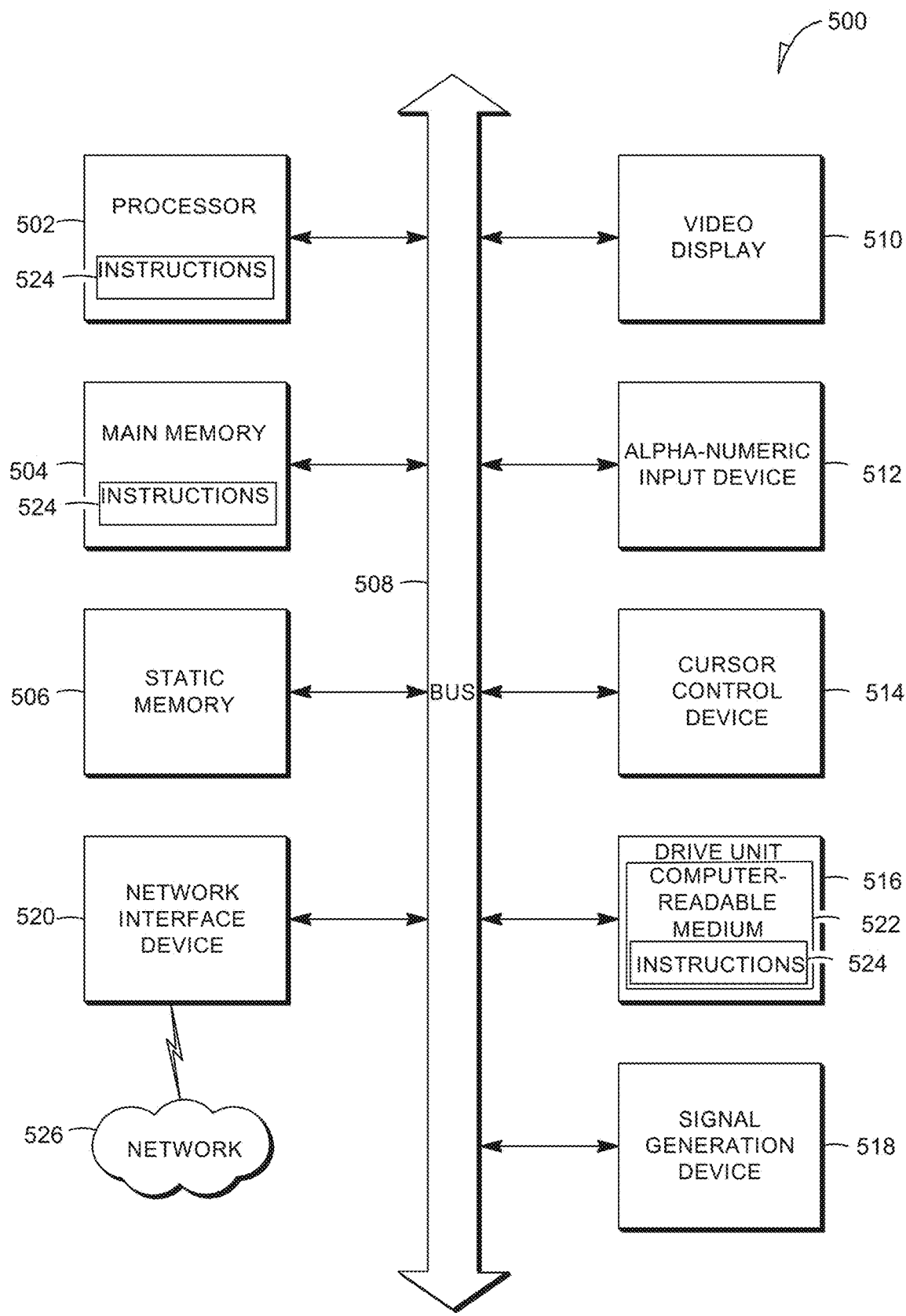
FIG. 5 is a block diagram of a computer system upon which embodiments of system and method can execute in accordance with one embodiment of the present invention.

FIG. 5 is a block diagram of an example embodiment of a computer system 500 upon which embodiments of the inventive subject matter can execute. The description of FIG. 5 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 5 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 5, an example embodiment extends to a machine in the example form of a computer system 500 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 500 may include a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). In example embodiments, the computer system 500 also includes one or more of an alpha-numeric input device 512 (e.g., a keyboard), a user interface (U/I) navigation device or cursor control device 514 (e.g., a mouse), a disk drive unit 516, a signal generation device 518 (e.g., a speaker), and a network interface device 520.

The disk drive unit 516 includes a machine-readable medium 522 on which is stored one or more sets of instructions 524 and data structures (e.g., software instructions) embodying or used by any one or more of the methodologies or functions described herein. The instructions 524 may also reside, completely or at least partially, within the main memory 504 or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 524 may further be transmitted or received over a communications network 526 using a signal transmission medium via the network interface device 520 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A computer-implemented method for detecting malware by determining a file similarity vector of an executable file, the computer-implemented method comprising steps of:
   determining, by a processor of a computer system, a set of one or more functions in the executable file;
   for each function in the set of one or more functions, determining, by the processor, if the function is a valid function, wherein the step of determining if the function is a valid function comprises:
      determining, by the processor, whether a predetermined or configurable number of instructions at a beginning of the function can be successfully disassembled; and
      in response to determining that the predetermined or configurable number of instructions can be successfully disassembled, determining, by the processor, that the function is valid;
   for each valid function in the set of one or more functions, determining, by the processor, a length of the function;
   determining, by the processor, one or more statistics associated with each valid function in the set of one or more functions, the one or more statistics including statistics based, at least in part, on the length of the function; and
   determining, by the processor, the file similarity vector based, at least in part, on the one or more statistics.

2. The method of claim 1, wherein the one or more statistics include at least one member of a group consisting of a number of functions in the executable file, a minimum function length, a maximum function length, an average function length, and an entropy value.

3. The method of claim 1, further comprising the step of:
   locating, by the processor, a beginning of the function in the executable file based, at least in part, on an instruction type.

4. The method of claim 1, wherein the step of determining if the function is a valid function comprises:
   in response to determining that the predetermined or configurable number of instructions cannot be successfully disassembled, determining, by the processor, that the function is invalid.

5. The method of claim 1, further comprising the step of:
   searching, by the processor, a code section for acquiring function references.

6. The method of claim 5, wherein the code section comprises a delimited functional block.

7. The method of claim 5, wherein a value in the code section is an opcode for a call instruction, and further comprising the step of:
   determining, by the processor, if a target address for the call instruction is for a valid function.

8. The method of claim 5, wherein a value in the code section is not an opcode for a call instruction, and further comprising the step of:
   determining, by the processor, if the value in the code section is a virtual address.

9. The method of claim 1, wherein the executable file includes a PE file used in a Microsoft Windows system, an ELF file used in a Linux system, an ELF file used in a UNIX system, or a Mach-O file used in a MAC OS X.

10. The method of claim 1, further comprising the step of:
    comparing, by the processor, the file similarity vector of the executable file with file similarity vectors associated with known malware to determine if the executable file contains malware.

11. The method of claim 10, further comprising the step of:
- calculating, by the processor, a Euclidian distance between the file similarity vector of the executable file and the file similarity vector of the malware.

12. A non-transitory computer readable storage medium having a program stored thereon, the program causing the computer to execute the steps of:
- determining a set of one or more functions in an executable file;
- for each function in the set of one or more functions, determining if the function is a valid function, wherein the step of determining if the function is a valid function comprises:
  - determining whether a predetermined or configurable number of instructions at a beginning of the function can be successfully disassembled; and
  - in response to determining that the predetermined or configurable number of instructions can be successfully disassembled, determining that the function is valid;
- for each valid function in the set of one or more functions, determining a length of the function;
- determining one or more statistics associated with each valid function in the set of one or more functions, the one or more statistics including statistics based, at least in part, on the length of the function; and
- determining the file similarity vector based, at least in part, on the one or more statistics.

13. The non-transitory computer readable storage medium of claim 12, wherein the one or more statistics include at least one member of a group consisting of a number of functions in the executable file, a minimum function length, a maximum function length, an average function length, and an entropy value.

14. The non-transitory computer readable storage medium of claim 12, further comprising the step of:
- locating a beginning of the function in the executable file based, at least in part, on an instruction type.

15. The non-transitory computer readable storage medium of claim 12, wherein the step of determining if the function is a valid function comprises:
- in response to determining that the predetermined or configurable number of instructions cannot be successfully disassembled, determining that the function is invalid.

16. The non-transitory computer readable storage medium of claim 12, further comprising the step of:
- comparing the file similarity vector of the executable file with file similarity vectors associated with known malware to determine if the executable file contains malware.

17. The non-transitory computer readable storage medium of claim 12, further comprising the step of:
- calculating a Euclidian distance between the file similarity vector of the executable file and the file similarity vector of the malware.

18. The non-transitory computer readable storage medium of claim 12, further comprising the step of:
- searching a code section for acquiring a function reference.

19. The non-transitory computer readable storage medium of claim 18, wherein a value in the code section is an opcode for a call instruction, and further comprising the step of:
- determining if a target address for the call instruction is for a valid function.

* * * * *